Aug. 19, 1952     E. A. PETRUCELLI     2,607,265
MOTORIZED CONTROL FOR PHOTOGRAPHIC ENLARGERS
Filed July 21, 1949     3 Sheets-Sheet 1

Inventor
Edward A. Petrucelli
Wooster & Davis Attorneys

Aug. 19, 1952     E. A. PETRUCELLI     2,607,265
MOTORIZED CONTROL FOR PHOTOGRAPHIC ENLARGERS
Filed July 21, 1949     3 Sheets-Sheet 2

Inventor
Edward A. Petrucelli
By Worster & Davis Attorneys

Aug. 19, 1952 — E. A. PETRUCELLI — 2,607,265
MOTORIZED CONTROL FOR PHOTOGRAPHIC ENLARGERS
Filed July 21, 1949 — 3 Sheets-Sheet 3

Inventor
Edward A. Petrucelli
Wooster Davis, Attorneys

Patented Aug. 19, 1952

2,607,265

UNITED STATES PATENT OFFICE 2,607,265

MOTORIZED CONTROL FOR PHOTOGRAPHIC ENLARGERS

Edward A. Petrucelli, Bridgeport, Conn.

Application July 21, 1949, Serial No. 105,957

4 Claims. (Cl. 88—24)

This invention relates to photographic enlargers, and more particularly to an improved control for such devices, whereby it may be more quickly and accurately properly adjusted for making the enlargement.

Another object is to provide an improved and simplified motorized control for such devices, by which the adjustments are effected.

This simplified and effective motor control provides a device which may be accurately controlled at all times by the operator and which will quickly make the adjustments desired.

Another object is to provide such a device in which the motor operated adjustments, such, for example, as the elevation of the camera to determine the amount of enlargement and the focusing of the camera, are remotely controlled from a common control point.

A still further object is to provide such a device in which enlarging lenses of different focal lengths may be employed and the adjustments made with the same motorized machanism.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

Figure 1:
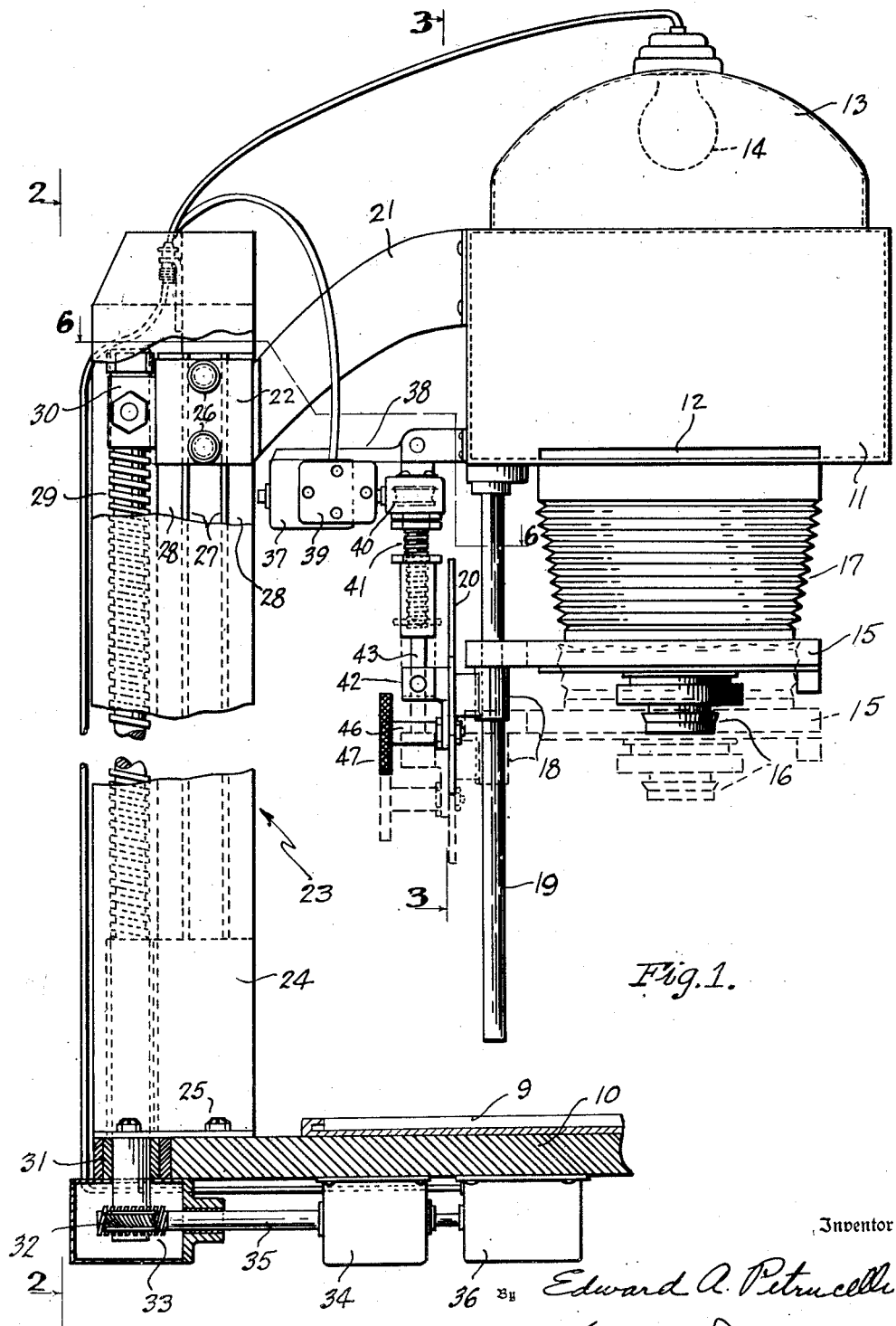
Fig. 1 is a side elevation of the device with parts broken away to more clearly show the construction.
Figure 2:
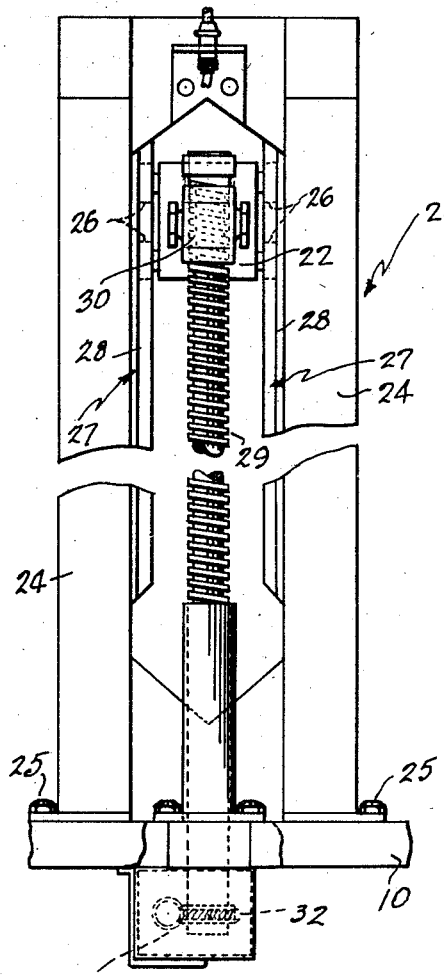
Fig. 2 is a partial rear elevation taken substantially on the plane of the line indicated by 2—2 in Fig. 1.
Figure 3:
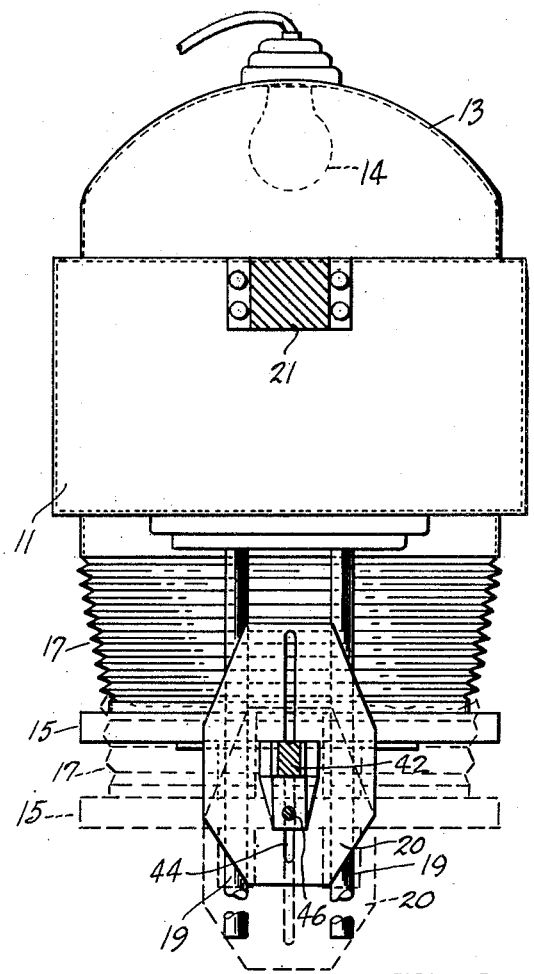
Fig. 3 is a detail view substantially on line 3—3 of Fig. 1.

This enlarger is of the type comprising a table or base 10 on which is supported the holder 9 for the sensitized paper, and above this table is a vertically movable lens for projecting the enlarged image on the sensitized paper. The enlarging camera box is indicated at 11 with a slot 12 in the side for insertion of the negative holder, and at the top is a lamp house 13 enclosing the light source, as a lamp 14, and the device may include condenser lenses and light diffusing elements (not shown) as are commonly used in this type of device. At the lower end is a lens board or other support 15, for the lens holder indicated diagrammatically at 16, this board being connected with the box 11 by a suitable adjustable bellows 17. The lens board 15 is mounted by a support including suitable guides 18 slidably mounted on upright guides 19 depending from the box 11. These guides may be of any suitable form, but in the present construction comprise a pair of laterally spaced rods secured by any suitable means to the box 11. On the inner side of the support having the guides 18 is mounted a slotted plate 20 forming an adjusting means for the lens board 15, as will later be described. The camera 11 with the lamp house and lens adjusting means is mounted on an arm 21 supported by a carriage 22 mounted for vertical adjustment in upright support 23 mounted on the base 10. This upright support may be of different constructions and types, but in the present device comprises a pair of upright laterally spaced columns 24, which may be of any suitable material, such as wood, or metal if preferred, secured to the base 10 by any suitable means, such as screws 25. These columns are laterally spaced so that the carriage 22 is mounted between them, this carrier or carriage being provided with a pair of rollers 26 on the opposite sides thereof running in suitable guides 27 on the inner sides of the columns 24. Any suitable type of guide may be used, but in the present case it comprises angle shaped members 28 secured to the inner sides of the columns 24 and with their inner flanges properly spaced to form guides for the rollers 26.

The carrier 22 is adjusted up and down to properly locate camera 11 with respect to the sensitized paper holder on the base 10 by means of a jack comprising a screw 29 having threaded engagement with a nut 30 secured to the back of the carriage 22 and supported in a suitable bearing 31 at its lower end mounted on the base 10. Mounted on this screw at its lower end is a worm gear 32 meshing with a suitable worm drive 33 operated by an electric motor 34 through the shaft 35 and controlled by a micro limit switch 36, which will be described later. This provides a suitable reducing drive for the screw.

Figure 5:
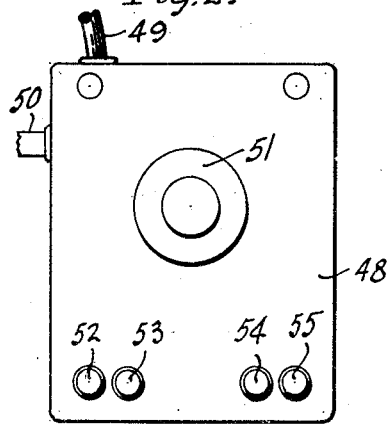
Fig. 5 is a plan view of the control box.
Figure 4:
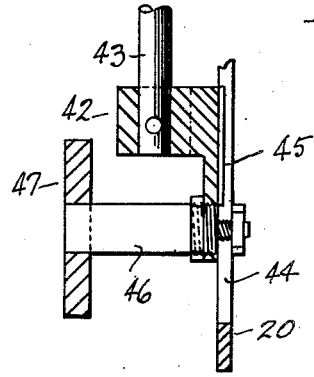
Fig. 4 is a detail sectional view of a part of the adjusting means.
Figure 7:
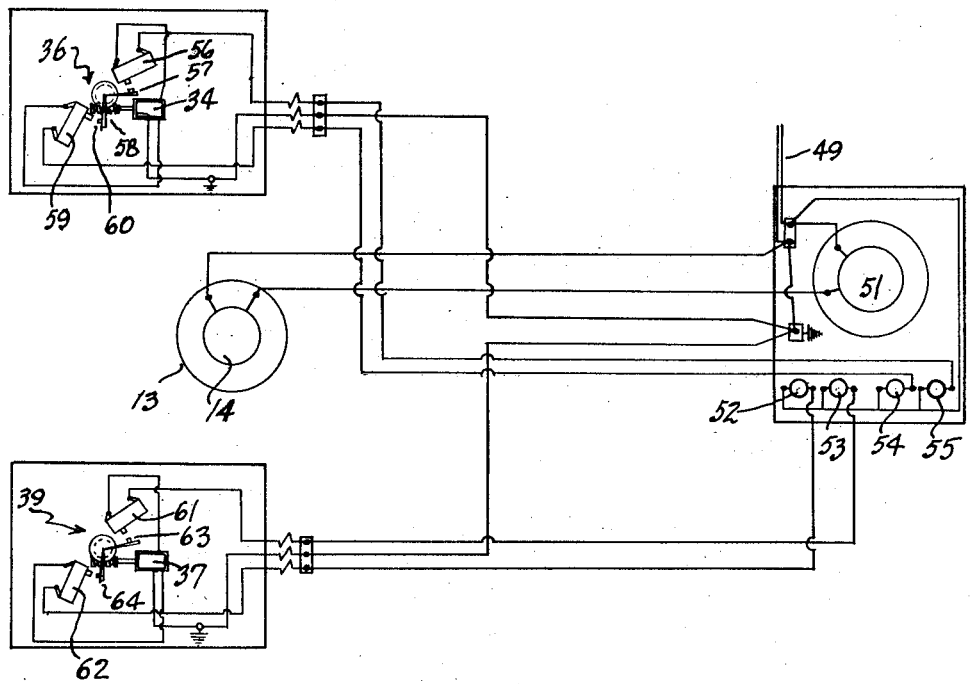
Fig. 7 is a wiring diagram of the control system.
Figure 6:
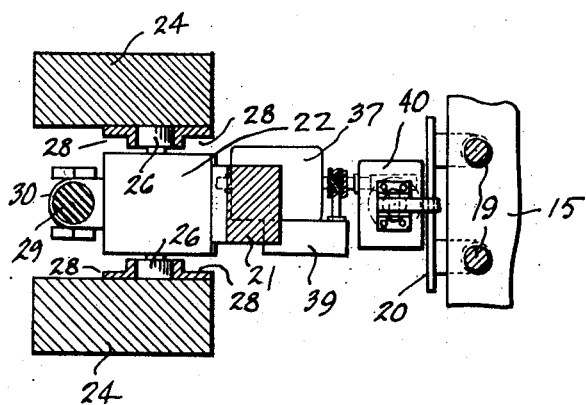
Fig. 6 is a transverse section substantially on line 6—6 of Fig. 1.

The lens board 15 carrying the lens is mounted for adjustment up and down toward and from the camera box 11 to adjust it with respect to the negative from which the enlargement is being made, and, as specified, carried by a holder in the slot 12. This is a focusing adjustment. This adjusting means comprises a small electric motor 37 mounted on a bracket or other suitable support 38 secured to the box 11 and controlled by a suitable microswitch 39. This motor operating through a reducing drive 40 operates a screw jack 41 connected to a bracket 42 by a bolt or rod connection 43, this bracket 42 being adjustably mounted on the face of the plate 20. The plate 20 is provided with an upright slot 44, and the bracket 42 has a rib 45 guided in this slot and carries a clamping screw 46 passing through the slot. By loosening this screw through the finger grip 47, plate 20 and the lens board 15 may be adjusted up and down with respect to screw jack 41 and then clamped in adjusted position. This will adjust the position of the lens with respect to the screw jack and the camera box 11 in which the negative holder is mounted, and therefore will permit lenses of different focal lengths to be mounted in the lens board 15 and adjusted with respect to the negative for focusing purposes, by means of the screw jack 41. The wiring diagram and controls are indicated diagrammatically in Fig. 7. The central control box is indicatd at 48 and is connected by a flexible cable 49 to any suitable source of current supply, such as an outlet from the house wiring system through the usual plug-in cap. Another cable 50 may be used to carry the various leads to the motors and their controls. As shown in Figs. 5 and 7, this control box may carry any suitable type of timer 51 for controlling the lamp in the lamp house to turn it on and off for the proper exposure, and a series of pushbuttons 52, 53, 54 and 55 for operating the elevation adjusting and focusing motors 34 and 37. The motor 34 for elevating the camera 11 and associated elements, or that is, adjusting it up and down by means of the carrier 22 and the screw jack 29, is controlled by the pushbuttons 54 and 55. That is, the pushbutton 55 will operate the motor 34 to shift the carriage 22 and the camera upwardly, the connection to the motor operating through the limit switch 56 including adjustable arms 57 rotated by a connection 58 with the motor in the control switch box 36. This limit or microswitch which can be purchased on the market is a safety feature to open the circuit at the end of the maximum movement of the carriage 22 to prevent breakage of the mechanism. Downward movement of the carriage and control mechanism is controlled by the pushbutton 54, and a similar switch 59 in box 36 is controlled by adjustable arm 60 also operated by the motor to limit downward movement of the carriage 22.

A similar drive and control is used for the focusing motor 37, this motor being controlled by the pushbuttons 52 and 53. Upward movement is controlled by the button 53 to operate the motor 37 which, through the screw jack 41 and a bracket connection 42 to the plate 20, will adjust the lens board 15 and therefore the lens up and down on the guides 19 and vary the position of this lens from the negative carried in the box 11, for the focusing operation. Upward movement of the operation of this motor is limited by limit switch 61 and downward movement by the limit switch 62 in the switch box 39 controlled by the adjustable arms 63 and 64 operated either from the motor or the reducing drive to limit upward and downward movement of the lens board to prevent breakage should the control switch buttons 52 and 53 be closed for too long a time.

Briefly then, in operation, vertical up and down movement of the camera with respect to the base 10 and the sensitized paper to determine the size of the enlargement is controlled by the screw jack 29 and motor 34, limit switch 36 and the pushbuttons 54 and 55 after the camera has been adjusted to proper elevation. Then the lens is adjusted up and down for focusing by means of the focusing motor 37 operating through the screw jack 41 and controlled by the control switches 39 and the pushbuttons 52 and 53. If it is desired to use lenses of different focal lengths the lens carrier may be changed in the lens board 15 and then the proper elevation of this board with respect to the focusing jack 41 may be determined by means of the clamping screw 46 and adjusting the lens board 15 in the plate 20 up and down with respect to bracket 42 connected to the screw jack 41. This provides an effective and easily operated means to properly locate the lens with respect to this jack, so that lenses of different focal lengths can be properly focused with respect to the negative in the camera and the sensitized paper on the base 10.

It will be seen that this comprises a very simple construction and arrangement and that the operations of properly adjusting the camera and lens may be very easily and quickly performed. The control box 48 may be located at any remote control station, and the operator can easily and quickly shift the camera up and down for the proper elevation and size of enlargement by means of the two control buttons 54 and 55. After the proper elevation of the camera has been determined the negative image can be quickly focused by shifting the lens up and down by the focusing jack 41 by means of the control buttons 52 and 53.

Having thus set forth the nature of my invention, I claim:

1. In a photographic enlarger comprising a base for a support for sensitized paper, an upright supporting column extending upwardly from the base including laterally spaced upright members provided with upright guideways on their opposed sides, an enlarging camera above the base including a lens, a lamp house, and means for supporting a negative between them, a carrier mounted between said members for up and down movement in the guideways on the supporting column, means mounting the camera on said carrier, means mounting the lens on the camera for vertical movement relative to the negative holding means, adjusting means comprising a screw located between the column members and connected with the carrier for raising and lowering the carrier to position the camera relative to the base, a motor for operating said screw, means mounted on the carrier for raising and lowering the lens relative to the negative holding means to focus the camera, a motor mounted on the carrier for operating the latter means, and a control station including manually operable means for controlling said motors.

2. In a photographic enlarger comprising a base, an upright supporting column extending upwardly from the base, a projection camera above the base including a lens, a carrier mounting the camera on the column for up and down movement, a screw jack for shifting the carrier on the column, and a motor for operating the jack; a focusing screw jack mounted on the carrier for shifting the lens toward and from the base independently of the carriage, a motor mounted on the carrier for operating the latter jack, a mount for the lens including an upright plate provided with an upright slot, a connection from said focusing jack to said plate adjustably mounted in said slot, manually operable means for clamping said connection in different adjusted positions along said slot, and manual control means for the motors.

3. In a photographic enlarger comprising a base, an upright supporting column including laterally spaced upright members extending upwardly from the base, a carrier, an upright guiding means on the opposed sides of the members of the column for said carrier, a projection camera mounted on the carrier including a lens and a mounting therefor including an upright plate provided with an upright slot, a screw jack connected with the carrier for adjusting the elevation of the camera, and a motor for operating said jack; a focusing screw jack mounted on the carrier and movable with the camera and including a member connected to the lens mounting for shifting it toward and from the base independently of the carrier and adjustable along said slot, manual means for clamping said member in different adjusted positions along the slot, a motor mounted on the carrier for operating the latter jack, and manual control means for the motors.

4. In a photographic enlarger comprising a base, an upright supporting column extending upwardly from the base, a carrier, guiding means for the carrier in said column, a projection camera mounted on said carrier, a screw jack for shifting the carrier to adjust the elevation of the camera and a motor for operating said jack; a lens mount mounted on the carrier including an upright plate provided with an upright slot, vertical guide means on the camera for said mount, a screw jack on the carrier including a member connected with the mount for shifting the mount on said guide means and adjustable along said slot, manually operable means for clamping said member in different adjusted positions along the slot, a motor mounted on the carrier for operating the latter jack, a control station, and manual means at the control station for controlling operation of said motors.

EDWARD A. PETRUCELLI.

REFERENCES CITED

The following references are of record in the file of this patent:

UNITED STATES PATENTS

| Number | Name | Date |
| --- | --- | --- |
| 1,406,041 | Lehto | Feb. 7, 1922 |
| 1,460,714 | Fritts | July 3, 1923 |
| 1,932,701 | Kurze | Oct. 31, 1933 |
| 2,249,229 | Rogers | July 15, 1941 |
| 2,372,910 | Pratt | Apr. 3, 1945 |